(12) United States Patent
Chang et al.

(10) Patent No.: US 11,570,563 B1
(45) Date of Patent: Jan. 31, 2023

(54) METHOD FOR ESTIMATING FUNDAMENTAL RESONANCE FREQUENCY OF LOUDSPEAKER AND ASSOCIATED LOUDSPEAKER CONTROLLER

(71) Applicant: Elite Semiconductor Microelectronics Technology Inc., Hsinchu (TW)

(72) Inventors: Jung-Kuei Chang, Hsinchu (TW); Wun-Long Yu, Hsinchu (TW)

(73) Assignee: Elite Semiconductor Microelectronics Technology Inc., Hsinchu (TW)

( * ) Notice: Subject to any disclaimer, the term of this patent is extended or adjusted under 35 U.S.C. 154(b) by 0 days.

(21) Appl. No.: 17/382,393

(22) Filed: Jul. 22, 2021

(51) Int. Cl.
*H04R 29/00* (2006.01)
*H04B 17/309* (2015.01)

(52) U.S. Cl.
CPC ......... *H04R 29/003* (2013.01); *H04B 17/309* (2015.01)

(58) Field of Classification Search
CPC .... H04R 29/001; H04R 29/003; H04R 29/00; H04B 17/309
See application file for complete search history.

(56) References Cited

U.S. PATENT DOCUMENTS

| | | | |
|---|---|---|---|
| 2015/0030167 A1 | 1/2015 | Pan | |
| 2015/0030169 A1 | 1/2015 | Pan | |
| 2015/0124982 A1* | 5/2015 | Berthelsen | H04R 29/001 381/59 |
| 2015/0201294 A1* | 7/2015 | Risberg | H04R 3/002 381/59 |
| 2018/0136899 A1* | 5/2018 | Risberg | H04R 3/04 |
| 2019/0028805 A1* | 1/2019 | Goto | H04R 29/001 |
| 2020/0228906 A1* | 7/2020 | Myers | H04R 29/001 |

* cited by examiner

*Primary Examiner* — Jason R Kurr
(74) *Attorney, Agent, or Firm* — Winston Hsu

(57) ABSTRACT

A loudspeaker controller for estimating a fundamental resonance frequency of a loudspeaker includes: an amplifier circuit, arranged to generate a driving signal of the loudspeaker according to an audio input signal; a sensing circuit, arranged to sense characteristics of the driving signal to generate a measurement signal; a plurality of band pass filter circuits, arranged to filter the measurement signal to generate a plurality of filter outputs, respectively, wherein the plurality of band pass filter circuits have different passbands; and an estimation circuit, arranged to estimate the fundamental resonance frequency according to the plurality of filter outputs.

18 Claims, 12 Drawing Sheets

US 11,570,563 B1

METHOD FOR ESTIMATING FUNDAMENTAL RESONANCE FREQUENCY OF LOUDSPEAKER AND ASSOCIATED LOUDSPEAKER CONTROLLER

BACKGROUND OF THE INVENTION

1. Field of the Invention

The present invention relates to frequency estimation, and more particularly, to a method for estimating a fundamental resonance frequency of a loudspeaker and an associated loudspeaker controller.

2. Description of the Prior Art

A loudspeaker is a device having a voice coil that moves a diaphragm and converts an electrical signal into an acoustic signal. However, for input signals that result in a large diaphragm displacement, the large diaphragm displacement may cause damage to the loudspeaker. In order to avoid the above problem, an operating frequency of the loudspeaker can be controlled within a fundamental resonance frequency of the loudspeaker. To find the fundamental resonance frequency of the loudspeaker, a diagram of an impedance curve of the loudspeaker may be obtained first, wherein the x-axis of the diagram is the frequency and the y-axis of the diagram is the impedance. Then, the fundamental resonance frequency of the loudspeaker can be found from the diagram by identifying a frequency corresponding to a maximum value of the impedance curve. It should be noted that the impedance curve of the loudspeaker may change with temperature; as a result, the fundamental resonance frequency of the speaker is not a fixed value.

For obtaining the diagram of the impedance curve of the loudspeaker and finding the fundamental resonance frequency from the diagram, a typical time-domain impedance measurement or a typical frequency-domain impedance measurement can be performed on the loudspeaker. The typical time-domain impedance measurement has the advantages of high accuracy and low cost; however, the typical time-domain impedance measurement cannot dynamically monitor the impedance and the fundamental resonance frequency during the loudspeaker is being driven for audio playback, and requires sweeping the frequencies. Regarding the typical frequency-domain impedance measurement, although the impedance and the fundamental resonance frequency can be dynamically monitored during the loudspeaker is being driven for the audio playback and is no need to sweep the frequencies, fast fourier transformation (FFT) in the frequency-domain impedance measurement is complex and may lead to higher hardware cost.

SUMMARY OF THE INVENTION

It is therefore an objective of the present invention to provide a method for estimating a fundamental resonance frequency. In addition to having the advantages of high accuracy and low cost, the method can also dynamically monitor impedance (particularly, fundamental resonance frequency) during a loudspeaker is being driven for audio playback.

According to one embodiment of the present invention, a method for estimating a fundamental resonance frequency is provided. The method may comprise: generating a driving signal of the loudspeaker according to an audio input signal; sensing characteristics of the driving signal to generate a measurement signal; filtering the measurement signal, by a plurality of band pass filter circuits having different passbands, to generate a plurality of filter outputs; and estimating the fundamental resonance frequency according to the plurality of filter outputs.

In addition to the above method, the present invention also provides a loudspeaker controller. The loudspeaker controller may comprise an amplifier circuit, arranged to generate a driving signal of the loudspeaker according to an audio input signal; a sensing circuit, arranged to sense characteristics of the driving signal to generate a measurement signal; a plurality of band pass filter circuits, arranged to filter the measurement signal to generate a plurality of filter outputs, respectively, wherein the plurality of band pass filter circuits have different passbands; and an estimation circuit, arranged to estimate the fundamental resonance frequency according to the plurality of filter outputs.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
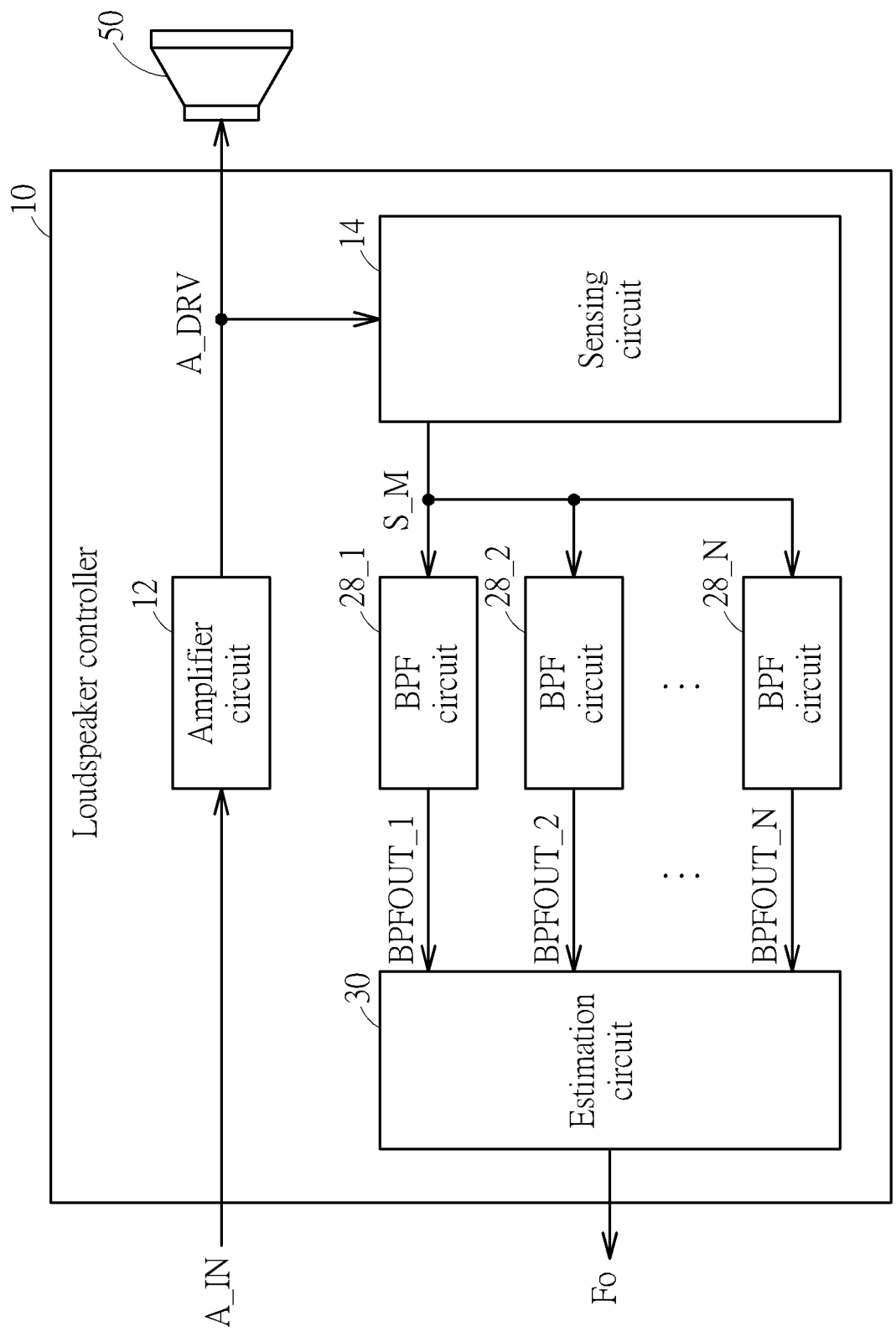
FIG. 1 is a block diagram illustrating a loudspeaker controller used for estimating a fundamental resonance frequency of a loudspeaker according to an embodiment of the present invention.

FIG. 1 is a block diagram illustrating a loudspeaker controller 10 used for estimating a fundamental resonance frequency of a loudspeaker 50 according to an embodiment of the present invention. As shown in FIG. 1, the loudspeaker controller 10 is coupled to the loudspeaker 50, and arranged to estimate the fundamental resonance frequency $F_o$ of the loudspeaker 50. It should be noted that the loudspeaker 50 has the highest impedance at its fundamental resonance frequency $F_o$. Hence, estimating the fundamental resonance frequency $F_o$ of the loudspeaker 50 may be achieved by estimating the highest impedance of the loudspeaker 50. The loudspeaker controller 10 may comprise an amplifier circuit 12, a sensing circuit 14, a plurality of band pass filter (BPF) circuits 28_1, 28_2, . . . , 28_N, and an estimation circuit 30, where "N" may represent a positive integer that is greater than one (i.e. N≥2). The amplifier circuit 12 is arranged to receive an audio input signal A_IN and generate a driving signal A_DRV of the loudspeaker 50 according to the audio input signal A_IN. The sensing circuit 14 is coupled to the amplifier circuit 12 and the loudspeaker 50, and is arranged to sense characteristics of the driving signal A_DRV and generate a measurement signal S_M. The BPF circuits 28_1-28_N are coupled to the sensing circuit 14, and are arranged to filter the measurement signal S_M and generate a plurality of filter outputs BPFOUT_1, BPFOUT_2, . . . , BPFOUT_N, respectively. The BPF circuits 28_1-28_N have different passbands. Hence, the filter outputs BPFOUT_1-BPFOUT_N may be different when the same measurement signal S_M is fed into the BPF circuits 28_1-28_N. The estimation circuit 30 is coupled to the BPF circuits 28_1-28_N, and is arranged to estimate the fundamental resonance frequency $F_o$ of the loudspeaker 50 according to the filter outputs BPFOUT_1-BPFOUT_N. During the loudspeaker 50 is being driven for audio playback, the loudspeaker controller 10 may estimate the fundamental resonance frequency $F_o$ of the loudspeaker 50 in a real-time manner.

In contrast to the typical time-domain impedance measurement, the proposed fundamental resonance frequency estimation scheme using a set of BPF circuits 28_1-28_N with passbands centered at different frequencies can dynamically monitor the impedance (particularly, fundamental resonance frequency) during the loudspeaker 50 is being driven for audio playback, and does not require sweeping the frequencies.

In contrast to the typical frequency-domain impedance measurement, the proposed fundamental resonance frequency estimation scheme using a set of BPF circuits 28_1-28_N with passbands centered at different frequencies does not require performing complicated FFT computation, and can be implemented with lower hardware cost. Further details of the proposed fundamental resonance frequency estimation scheme are described as below with reference to accompanying drawings.

Figure 2:
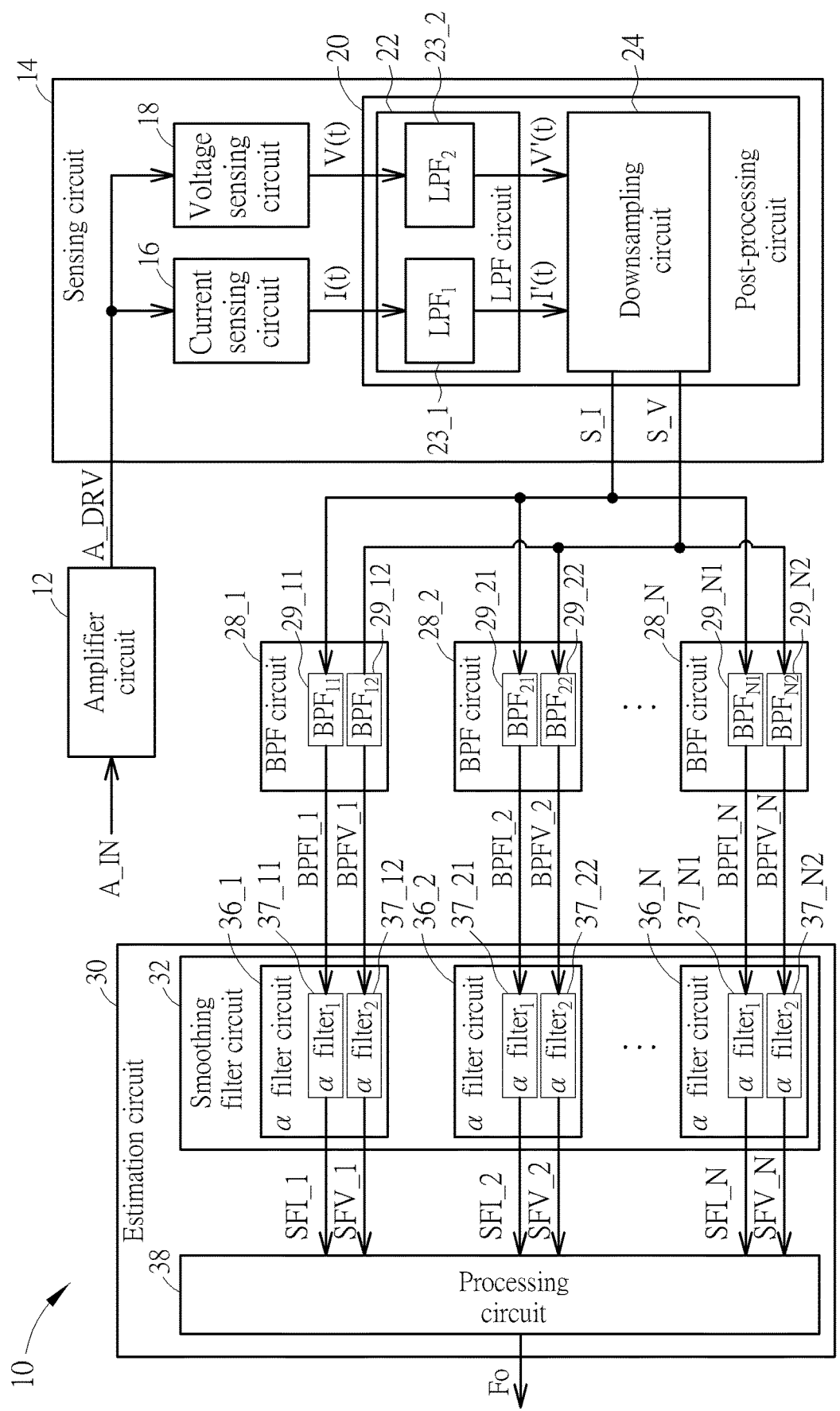
FIG. 2 is a diagram illustrating one exemplary implementation of the loudspeaker controller shown in FIG. 1 according to an embodiment of the present invention.

FIG. 2 is a diagram illustrating one implementation of the loudspeaker controller shown in FIG. 1 according to an embodiment of the present invention. As mentioned above, the sensing circuit 14 is arranged to sense characteristics of the driving signal A_DRV and generate the measurement signal S_M. For example, the characteristics of the driving signal A_DRV may include a voltage value and a current value. As shown in FIG. 2, the sensing circuit 14 may comprise a current sensing circuit 16, a voltage sensing circuit 18, and a post-processing circuit 20. The current sensing circuit 16 may measure a current flowing through a voice coil of the loudspeaker 50 to generate the measured current signal I(t), and the voltage sensing circuit 18 may measure a voltage across the voice coil of the loudspeaker 50 to generate the measured voltage signal V(t). The post-processing circuit 20 is arranged to generate the measurement signal S_M according to the measured current signal I(t) and the measured voltage signal V(t).

In this embodiment, the post-processing circuit 20 may comprise a low pass filter (LPF) circuit 22 and a downsampling circuit 24, wherein the downsampling circuit 24 is coupled to the LPF circuit 22. The LPF circuit 22 may comprise a first LPF 23_1 and a second LPF 23_2 (for brevity, labeled as "$LPF_1$" and "$LPF_2$," respectively), wherein the first LPF 23_1 can receive the measured current signal I(t) generated by the current sensing circuit 16, and can low pass filter the measured current signal I(t) to generate a low pass filtered current signal I'(t), and the second LPF 23_2 can receive the measured voltage signal V(t) generated by the voltage sensing circuit 18, and can low pass filter the measured voltage signal V(t) to generate a low pass filtered voltage signal V'(t). For reducing the computational complexity and/or increasing the accuracy, the downsampling circuit 24 may receive the low pass filtered current signal I'(t) and the low pass filtered voltage signal V'(t), and then downsample the low pass filtered current signal I'(t) and the low pass filtered voltage signal (t), respectively, to generate a downsampled current signal S_I and a downsampled voltage signal S_V, wherein the measurement signal S_M shown in FIG. 1 may comprise the downsampled current signal S_I and the downsampled voltage signal S_V shown in FIG. 2.

According to this embodiment, the sensing circuit 14 can transmit the measurement signal S_M to the BPF circuits 28_1-28_N, wherein the measurement signal S_M may comprise a current signal and a voltage signal (i.e. the downsampled current signal S_I and the downsampled voltage signal S_V). Please note that, the number of BPF circuits 28_1-28_N implemented in the loudspeaker controller 10, a bandwidth of the passband of each of the BPF circuits 28_1-28_N, and/or a center frequency of the passband of each of the BPF circuits 28_1-28_N (i.e. the location of the passband of each of the BPF circuits 28_1-28_N) can be adjusted, depending upon actual design considerations. For example, the BPF circuits 28_1-28_N can be configured to have respective passbands fixedly positioned/distributed within a frequency range based on a nominal fundamental resonance frequency of the loudspeaker 50 that is provided by the manufacturer of the loudspeaker 50. For another example, the BPF circuits 28_1-28_N can be configured to have respective passbands dynamically positioned/distributed within a frequency range based on the time-varying fundamental resonance frequency of the loudspeaker 50 that is measured during the loudspeaker 50 being driven for audio playback. To put it simply, any loudspeaker controller using a set of BPF circuits with passbands centered at different frequencies for fundamental resonance frequency estimation (or impedance estimation) falls within the scope of the present invention.

In addition, each of the BPF circuits 28_1-28_N may comprise two band pass filters. For example, the BPF circuit 28_1 includes a first band pass filter 29_11 and a second band pass filter 29_12 (for brevity, labeled as "$BPF_{11}$" and "$BPF_{12}$" respectively); the BPF circuit 28_2 includes a first band pass filter 29_21 and a second band pass filter 29_22 (for brevity, labeled as "$BPF_{21}$" and "$BPF_{22}$" respectively); and the BPF circuit 28_N includes a first band pass filter 29_N1 and a second band pass filter 29_N2 (for brevity, labeled as "BPF$_{N1}$" and "BPF$_{N2}$" respectively). The first band pass filter and the second band pass filter of the same BPF circuit have a same center frequency (i.e. positioned at the same location), where the first band pass filter can be arranged to receive the current signal (e.g. downsampled current signal S_I) from the sensing circuit 14, and generate a band pass filtered current signal by filtering the current signal, and the second band pass filter can be arranged to receive the voltage signal (e.g. downsampled voltage signal S_V) from the sensing circuit 14, and generate a band pass filtered voltage signal by filtering the voltage signal, and a filter output of the band pass filter circuit comprises the band pass filtered current signal and the band pass filtered voltage signal. For example, the filter output BPFOUT_1 includes the band pass filtered current signal BPFI_1 and the band pass filtered voltage signal BPFV_1, the filter output BPFOUT_2 includes the band pass filtered current signal BPFI_2 and the band pass filtered voltage signal BPFV_2, and the filter output BPFOUT_N includes the band pass filtered current signal BPFI_N and the band pass filtered voltage signal BPFV_N.

It should be noted that, for estimating the time-varying fundamental resonance frequency of the loudspeaker 50, the BPF circuits 28_1-28_N can be pre-positioned in a frequency range based on the nominal fundamental resonance frequency of the loudspeaker 50 before fundamental resonance frequency estimation starts. However, this is for illustrative purposes only, and is not meant to be a limitation of the present invention.

The estimation circuit 30 of the loudspeaker controller 10 may comprise a smoothing filter circuit 32 and a processing circuit 38. The smoothing filter circuit 32 can be arrange to receive filter outputs from the BPF circuits 28_1-28_N and generate a plurality of smoothed filter outputs by smoothing the filter outputs respectively. In this embodiment, the smoothing filter circuit 32 may comprise a plurality of alpha filter circuits 36_1, 36_2, . . . , 36_N coupled to the BPF circuits 28_1-28_N, respectively. In addition, each of the alpha filter circuits 36_1-36_N may comprise a first alpha filter and a second alpha filter (for brevity, labeled as "α filter$_1$" and "α filter$_2$" respectively). For example, the alpha filter circuits 36_1 comprises a first alpha filter 37_11 and a second alpha filter 37_12 (which are coupled to the first band pass filter 29_11 and the second band pass filter 29_12, respectively), the alpha filter circuit 36_2 comprises a first alpha filter 37_21 and a second alpha filter 37_22 (which are coupled to the first band pass filter 29_21 and the second band pass filter 29_22, respectively), and the alpha filter circuit 36_N comprises a first alpha filter 37_N1 and a second alpha filter 37_N2 (which are coupled to the first band pass filter 29_N1 and the second band pass filter 29_N2, respectively).

Since a filter output received by one alpha filter circuit includes one current signal and one voltage signal, a smoothed filter output generated from one alpha filter circuit includes one current signal and one voltage signal. For each smoothed filter output consisting of a smooth current signal and a smooth voltage signal, a first alpha filter of an alpha filter circuit may be arranged to receive a band pass filtered current signal from an BPF circuit and generate the smoothed current signal, and the second alpha filter of the alpha filter circuit may be arranged to receive a band pass filtered voltage signal from the BPF circuit and generate the smoothed voltage signal. As shown in FIG. 2, a smoothed filter output generated from the alpha filter circuit 36_1 includes the smoothed current signal SFI_1 derived from passing the band pass filtered current signal BPFI_1 through the first alpha filter 37_11, and further includes the smoothed voltage signal SFV_1 derived from passing the band pass filtered voltage signal BPFV_1 through the second alpha filter 37_12; a smoothed filter output generated from the alpha filter circuit 36_2 includes the smoothed current signal SFI_2 derived from passing the band pass filtered current signal BPFI_2 through the first alpha filter 37_21, and further includes the smoothed voltage signal SFV_2 derived from passing the band pass filtered voltage signal BPFV_2 through the second alpha filter 37_22; and a smoothed filter output generated from the alpha filter circuit 36_N includes the smoothed current signal SFI_N derived from passing the band pass filtered current signal BPFI_N through the first alpha filter 37_N1, and further includes the smoothed voltage signal SFV_N derived from passing the band pass filtered voltage signal BPFV_N through the second alpha filter 37_N2.

The alpha filter circuit in the smoothing filter circuit 32 can convert one filter output into one smoothed filter output, for avoiding or mitigating a phase difference between a current signal and a voltage signal. That is, a phase difference between a current signal and a voltage signal included in a smoothed filter output generated by an alpha filter circuit is smaller than a phase difference between a current signal and a voltage signal included in a filter output fed into the alpha filter circuit. In this way, the accuracy of fundamental resonance frequency estimation can be improved.

For each of the smoothed filter outputs generated from the smoothing filter circuit 32 (particularly, alpha filter circuits 36_1-36_N of the smoothing filter circuit 32), the processing circuit 38 may be arranged to divide the smoothed voltage signal by the smoothed current signal to generate an impedance value. The processing circuit 38 may be further arranged to estimate the fundamental resonance frequency F$_o$ of the loudspeaker 50 by comparing a plurality of impedance values {SFI_1/SFV_1, SFI_2/SFV_2, . . . , SFI_N/SFV_N} obtained from the smoothed filter outputs.

In a case where one maximum value is identified from the impedance values {SFI_1/SFV_1, SFI_2/SFV_2, . . . , SFI_N/SFV_N}, the fundamental resonance frequency F$_o$ of the loudspeaker 50 is estimated as the center frequency of the band pass filter circuit involved in derivation of the maximum value. For example, if the center frequency of the band pass filter circuit corresponding to the maximum value among the impedance values {SFI_1/SFV_1, SFI_2/SFV_2, . . . , SFI_N/SFV_N} is 200 hertz (Hz), the fundamental resonance frequency F$_o$ of the loudspeaker 50 can be estimated as 200 Hz.

In another case where the impedance values {SFI_1/SFV_1, SFI_2/SFV_2, . . . , SFI_N/SFV_N} include two impedance values having the same maximum value, the fundamental resonance frequency F$_o$ of the loudspeaker 50 is estimated as an average of center frequencies of two band pass filter circuits involved in derivation of the two impedance values having the same maximum value. For example, if the center frequency of one band pass filter circuit corresponding to the maximum value among the impedance values {SFI_1/SFV_1, SFI_2/SFV_2, . . . , SFI_N/SFV_N} is 200 hertz (Hz), and the center frequency of another band pass filter circuit corresponding to the same maximum value among the impedance values {SFI_1/SFV_1, SFI_2/SFV_2, . . . , SFI_N/SFV_N} is 210 hertz (Hz), the fundamental resonance frequency F$_o$ of the loudspeaker 50 can be estimated as 205 Hz. However, this is for illustrative purposes only, and is not meant to be a limitation of the present invention. Alternatively, the fundamental resonance frequency $F_o$ of the loudspeaker 50 may be estimated as any frequency value within a frequency range from 200 Hz to 210 Hz.

Figure 3:
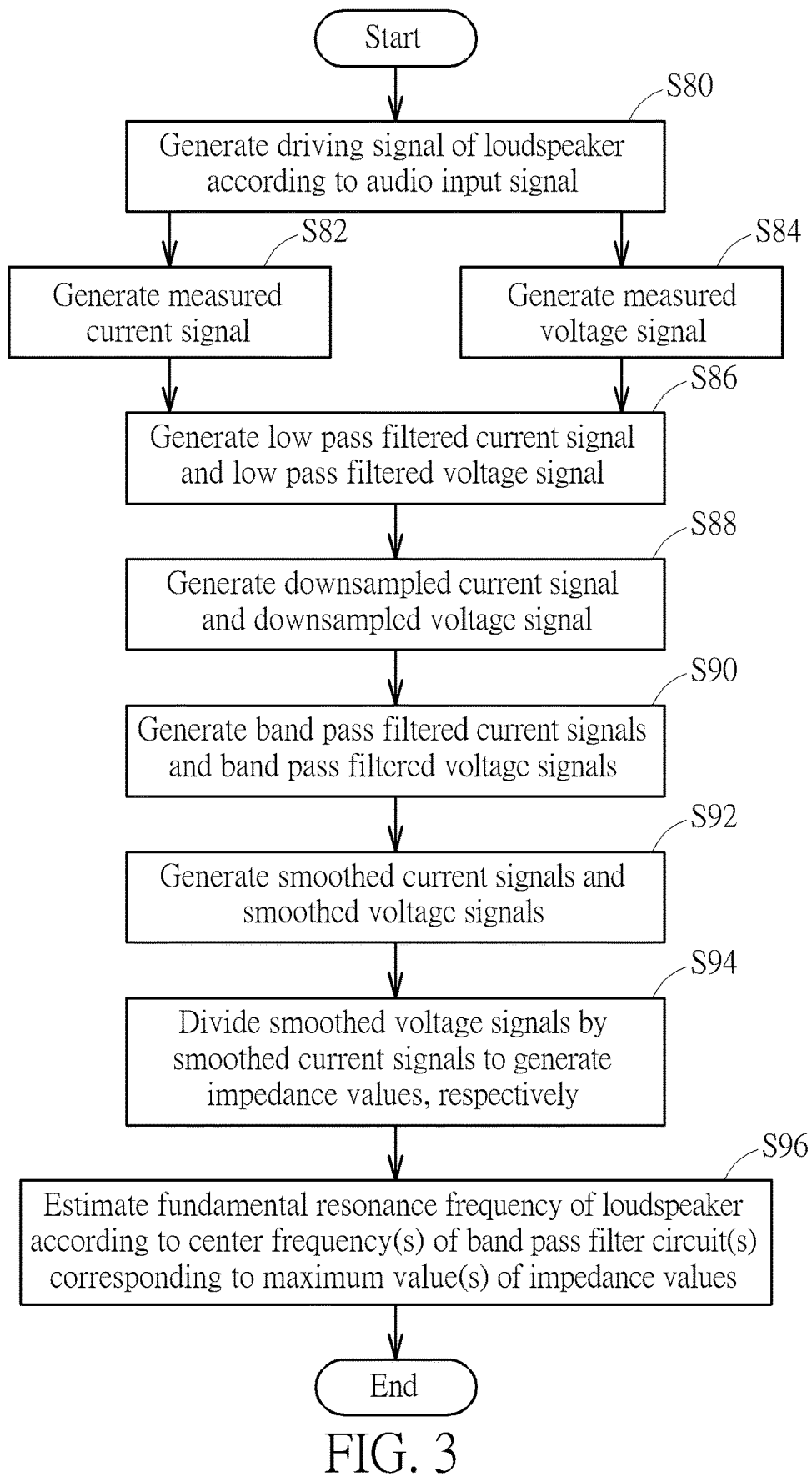
FIG. 3 is a flow chart illustrating a method for estimating a fundamental resonance frequency of a loudspeaker according to an embodiment of the present invention.

FIG. 3 is a flow chart illustrating a method for estimating a fundamental resonance frequency of a loudspeaker according to an embodiment of the present invention. Provided that the result is substantially the same, the steps are not required to be executed in the exact order shown in FIG. 3. For example, the method shown in FIG. 3 may be employed by the loudspeaker controller 10 shown in FIG. 2.

In Step S80, a driving signal A_DRV of the loudspeaker 50 is generated according to an audio input signal A_IN.

In Step S82, a current flowing through a voice coil of the loudspeaker 50 is measured to generate a measured current signal I(t).

In Step S84, a voltage across the voice coil of the loudspeaker 50 is measured to generate a measured voltage signal V(t).

In Step S86, the measured current signal I(t) is low pass filtered to generate a low pass filtered current signal I'(t), and the measured voltage signal V(t) is low pass filtered to generate a low pass filtered voltage signal V'(t).

In Step S88, the low pass filtered current signal I'(t) and the low pass filtered voltage signal V'(t) are downsampled to generate a downsampled current signal S_I and a downsampled voltage signal S_V, respectively.

In Step S90, a plurality of band pass filtered current signals BPFI_1-BPFI_N and a plurality of band pass filtered voltage signals BPFV_1-BPFV_N are generated from using BPF circuits 28_1-28_N with different passbands (e.g. passbands with different center frequencies), where a band pass filtered current signal and a band pass filtered voltage signal are generated from each of the BPF circuits 28_1-28_N.

In Step S92, the band pass filtered current signals BPFI_1-BPFI_N are smoothed to generate a plurality of smoothed current signals SFI_1-SFI_N, and the band pass filtered voltage signals BPFV_1-BPFV_N are smoothed to generate a plurality of smoothed voltage signals SFV_1-SFV_N.

In Step S94, a plurality of impedance values are generated according to the smoothed current signals SFI_1-SFI_N and the smoothed voltage signals SFV_1-SFV_N, where for each smoothed filter output including of a smoothed current signal and a smoothed voltage signal, the smoothed voltage signal is divided by the smoothed current signal to generate an impedance value.

In Step S96, the fundamental resonance frequency of the loudspeaker 50 is estimated according to center frequency(s) of band pass filter circuit(s) corresponding to maximum value(s) among the impedance values.

Since a person skilled in the pertinent art can readily understand details of the steps after reading above paragraphs directed to the loudspeaker controller 10 shown in FIG. 1 and FIG. 2, further description is omitted here for brevity.

Figure 4:
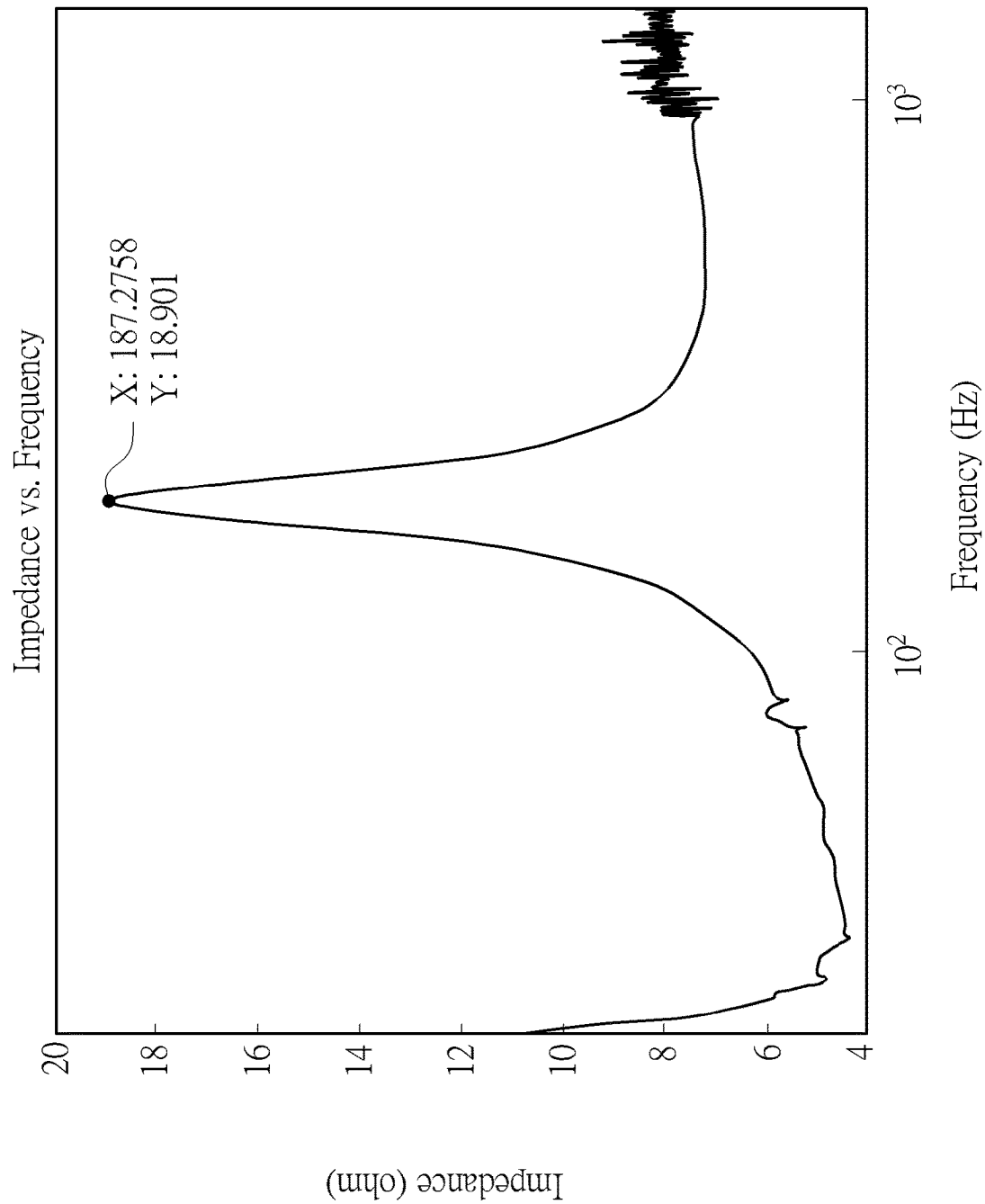
FIG. 4 is a diagram illustrating an impedance curve of a loudspeaker obtained by a frequency-domain impedance measurement with FFT.
Figure 5:
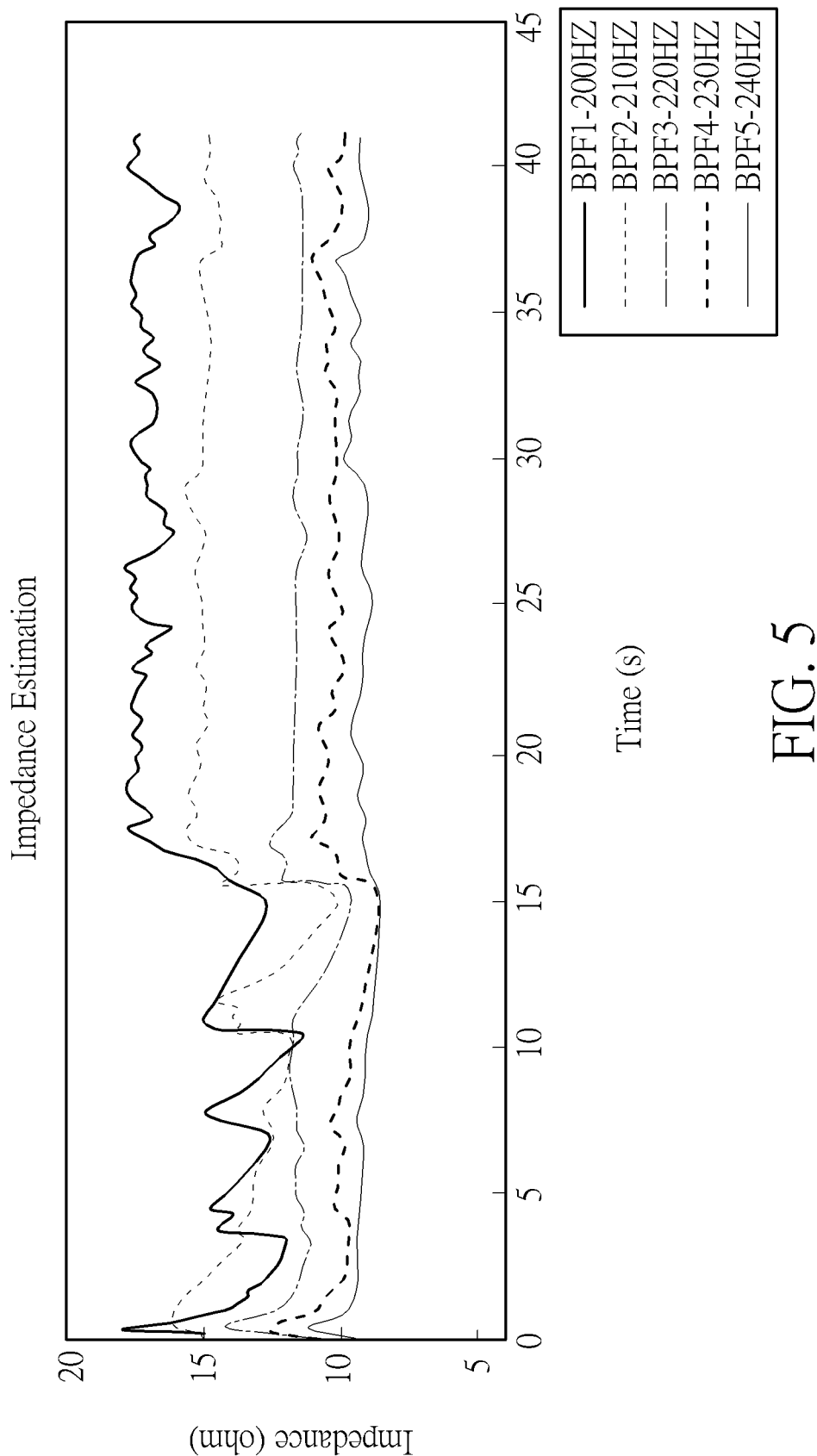
FIG. 5 is a diagram illustrating estimation of a fundamental resonance frequency of a loudspeaker by the method shown in FIG. 3 according to a first embodiment of the present invention.

In order to clarify that compared with using FFT analysis to obtain the fundamental resonance frequency, the present invention can also estimate the fundamental resonance frequency with high accuracy and low cost, the following uses a frequency-domain impedance measurement with FFT and the method of the present invention to analyze and obtain the fundamental resonance frequency of a loudspeaker playing a set of specific music, respectively. Please refer to FIG. 4 in conjunction with FIG. 5. FIG. 4 is a diagram illustrating an impedance curve of a loudspeaker 50 obtained by a frequency-domain impedance measurement with FFT. FIG. 5 is a diagram illustrating estimation of a fundamental resonance frequency $F_o$ of a loudspeaker 50 by the method shown in FIG. 3 according to a first embodiment of the present invention. As shown in FIG. 4, by the frequency-domain impedance measurement with FFT, it is known that the fundamental resonance frequency $F_o$ of the loudspeaker 50 is approximately equal to 190 Hz. As shown in FIG. 5, by the method shown in FIG. 3, five BPF circuits 28_1-28_N (N=5) can be pre-positioned at 200 Hz, 210 Hz, 220 Hz, 230 Hz, and 240 Hz based on a nominal fundamental resonance frequency before estimating the fundamental resonance frequency $F_o$ of the loudspeaker 50, but the present invention is not limited thereto.

As shown in FIG. 5, the BPF circuit at 200 Hz (i.e. BPF circuit 28_1) corresponds to the highest impedance, wherein the highest impedance is approximately equal to 19 ohm. Therefore, it can be estimated that the fundamental resonance frequency $F_o$ of the loudspeaker 50 is closest to 200 Hz. In the estimation of the fundamental resonance frequency of the loudspeaker, an error is usually within the tolerable range of less than 50 Hz, and the difference between 200 Hz and 190 Hz (i.e. 10 Hz) is less than 50 Hz; as a result, the method shown in FIG. 3 can estimate the fundamental resonance frequency $F_o$ of the loudspeaker 50 with high accuracy and low cost compared to the frequency-domain impedance measurement with FFT.

Figure 6:
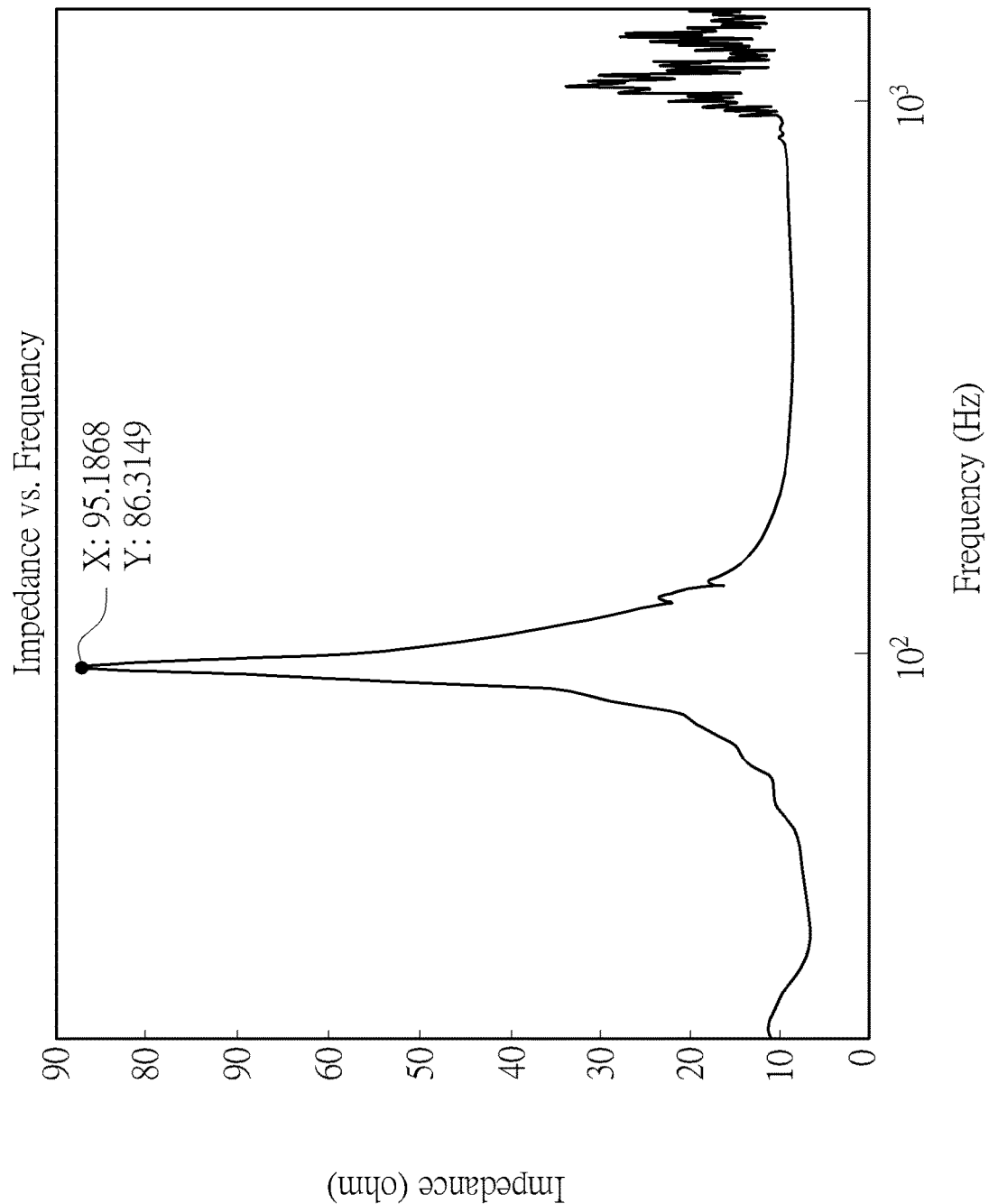
FIG. 6 is a diagram illustrating another impedance curve of a loudspeaker obtained by a frequency-domain impedance measurement with FFT.
Figure 7:
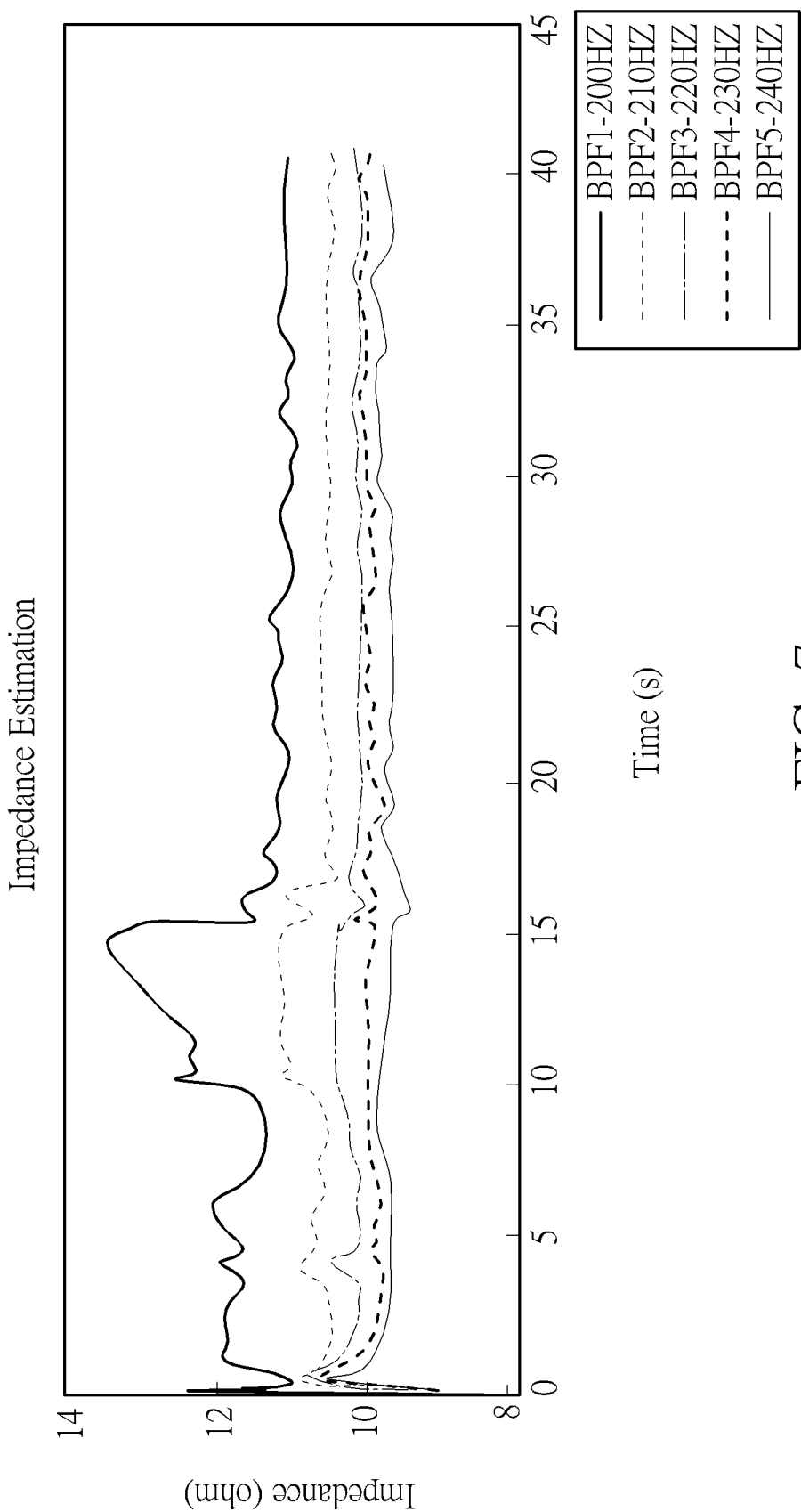
FIG. 7 is a diagram illustrating estimation of a fundamental resonance frequency of a loudspeaker by the method shown in FIG. 3 according to a second embodiment of the present invention.

Please refer to FIG. 6 in conjunction with FIG. 7. FIG. 6 is a diagram illustrating another impedance curve of a loudspeaker 50 obtained by a frequency-domain impedance measurement with FFT. FIG. 7 is a diagram illustrating estimation of a fundamental resonance frequency $F_o$ of a loudspeaker 50 by the method shown in FIG. 3 according to a second embodiment of the present invention. As shown in FIG. 6, by the frequency-domain impedance measurement with FFT, it is known that the fundamental resonance frequency $F_o$ of the loudspeaker 50 is approximately equal to 95 Hz. As shown in FIG. 7, by the method shown in FIG. 3, although the fundamental resonance frequency $F_o$ shown in FIG. 6 is approximately equal to 95 Hz, five BPF circuits 28_1-28_N (N=5) can still be pre-positioned at 200 Hz, 210 Hz, 220 Hz, 230 Hz, and 240 Hz before estimating the fundamental resonance frequency $F_o$ of the loudspeaker 50, wherein these frequencies are far from the fundamental resonance frequency shown in FIG. 6, but the present invention is not limited thereto.

As shown in FIG. 7, the BPF circuit at 200 Hz (i.e. BPF circuit 28-1) corresponds to the highest impedance, wherein the highest impedance is approximately equal to 14 ohm. Therefore, it can be estimated that the fundamental resonance frequency $F_o$ of the loudspeaker 50 is closest to 200 Hz. In the estimation of the fundamental resonance frequency of the loudspeaker, an error is usually within the tolerable range of less than 50 Hz, and the difference between 200 Hz and 95 Hz (i.e. 105 Hz) is more than 50 Hz. Although the method shown in FIG. 3 according the present invention cannot accurately estimate the fundamental resonance frequency $F_o$ of the loudspeaker 50 with such center frequency settings of BPF circuits, the trend of the fundamental resonance frequency $F_o$ of the loudspeaker 50 can still be known by the method shown in FIG. 3 due to the fact that the closer the frequency where the BPF circuit is positioned is to the fundamental resonance frequency $F_o$ of the loudspeaker 50, the greater the impedance value of the BPF circuit is. The current estimation result of the fundamental resonance frequency $F_o$ of the loudspeaker 50 may be used as a reference for adaptively adjusting the center frequency settings of BPF circuits. In this way, the method shown in FIG. 3 according the present invention can accurately estimate the fundamental resonance frequency $F_o$ of the loudspeaker 50 after center frequency settings of BPF circuits are properly adjusted according to the trend of the fundamental resonance frequency $F_o$ of the loudspeaker 50.

Figure 8:
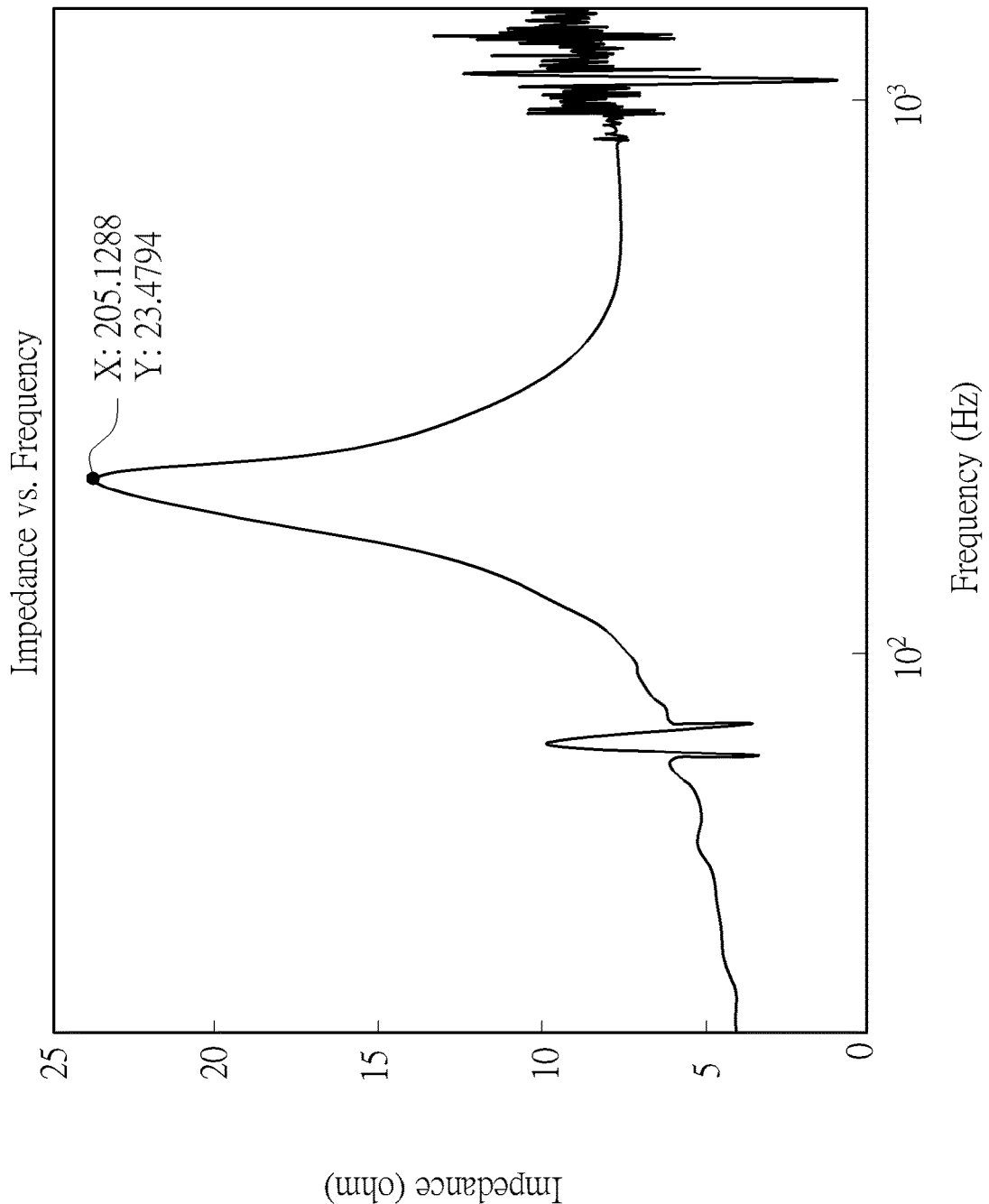
FIG. 8 is a diagram illustrating yet another impedance curve of a loudspeaker obtained by a frequency-domain impedance measurement with FFT.
Figure 9:
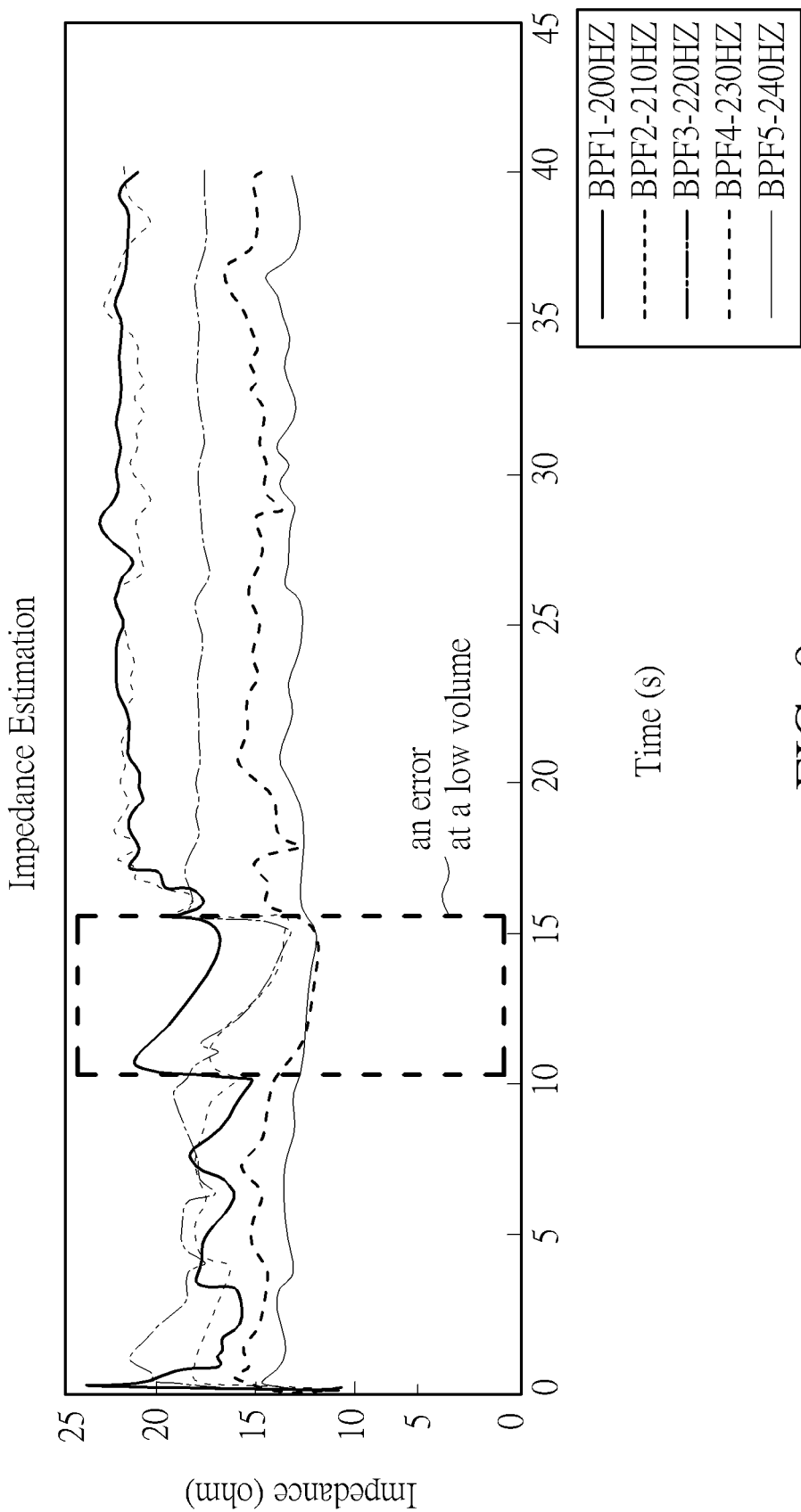
FIG. 9 is a diagram illustrating estimation of a fundamental resonance frequency of a loudspeaker by the method shown in FIG. 3 according to a third embodiment of the present invention.

Please refer to FIG. 8 in conjunction with FIG. 9. FIG. 8 is a diagram illustrating yet another impedance curve of a loudspeaker 50 obtained by a frequency-domain impedance measurement with FFT. FIG. 9 is a diagram illustrating estimation of a fundamental resonance frequency $F_o$ of a loudspeaker 50 by the method shown in FIG. 3 according to a third embodiment of the present invention. As shown in FIG. 8, by the frequency-domain impedance measurement with FFT, it is known that the fundamental resonance frequency $F_o$ of the loudspeaker 50 is approximately equal to 205 Hz. As shown in FIG. 9, by the method shown in FIG. 3, five BPF circuits 28_1-28_N (N=5) can be pre-positioned at 200 Hz, 210 Hz, 220 Hz, 230 Hz, and 240 Hz based on a nominal fundamental resonance frequency before estimating the fundamental resonance frequency $F_o$ of the loudspeaker 50, but the present invention is not limited thereto.

As shown in FIG. 9, the impedance values derived from a filter output of the BPF circuit at 200 Hz such as BPF circuit 28_1 and the impedance values derived from a filter output of the BPF circuit at 210 Hz such as BPF circuit 28_2 are quite close; therefore, it is difficult to determine which BPF circuit has the highest impedance. In this case, the middle frequency 205 Hz between 200 Hz and 210 Hz can be estimated as the fundamental resonance frequency $F_o$ of the loudspeaker 50. In the estimation of the fundamental resonance frequency of the loudspeaker, an error is usually within the tolerable range of less than 50 Hz, and the estimation result of this embodiment is exactly the same as the fundamental resonance frequency of the loudspeaker; as a result, the method shown in FIG. 3 according the present invention can estimate the fundamental resonance frequency $F_o$ of the loudspeaker 50 with high accuracy and low cost compared to the frequency-domain impedance measurement with FFT.

It should be noted that when the loudspeaker 50 is being driven for the audio playback at a low volume, the estimation result of the method shown in FIG. 3 may have an error, for example, in the time 10s-15s shown in FIG. 9, the BPF circuit at 200 Hz (i.e. BPF circuit 28_1) corresponds to the highest impedance, which is different from the above-mentioned case that the impedance values derived from the filter output of the BPF circuit at 200 Hz (e.g. BPF circuit 28_1) and the impedance values derived from the filter output of the BPF circuit at 210 Hz (e.g. BPF circuit 28_2) are quite close. To address this issue, a magnitude threshold may be added to the loudspeaker controller, to avoid the error that occurs when the loudspeaker 50 is being driven for the audio playback at the low volume.

Figure 10:
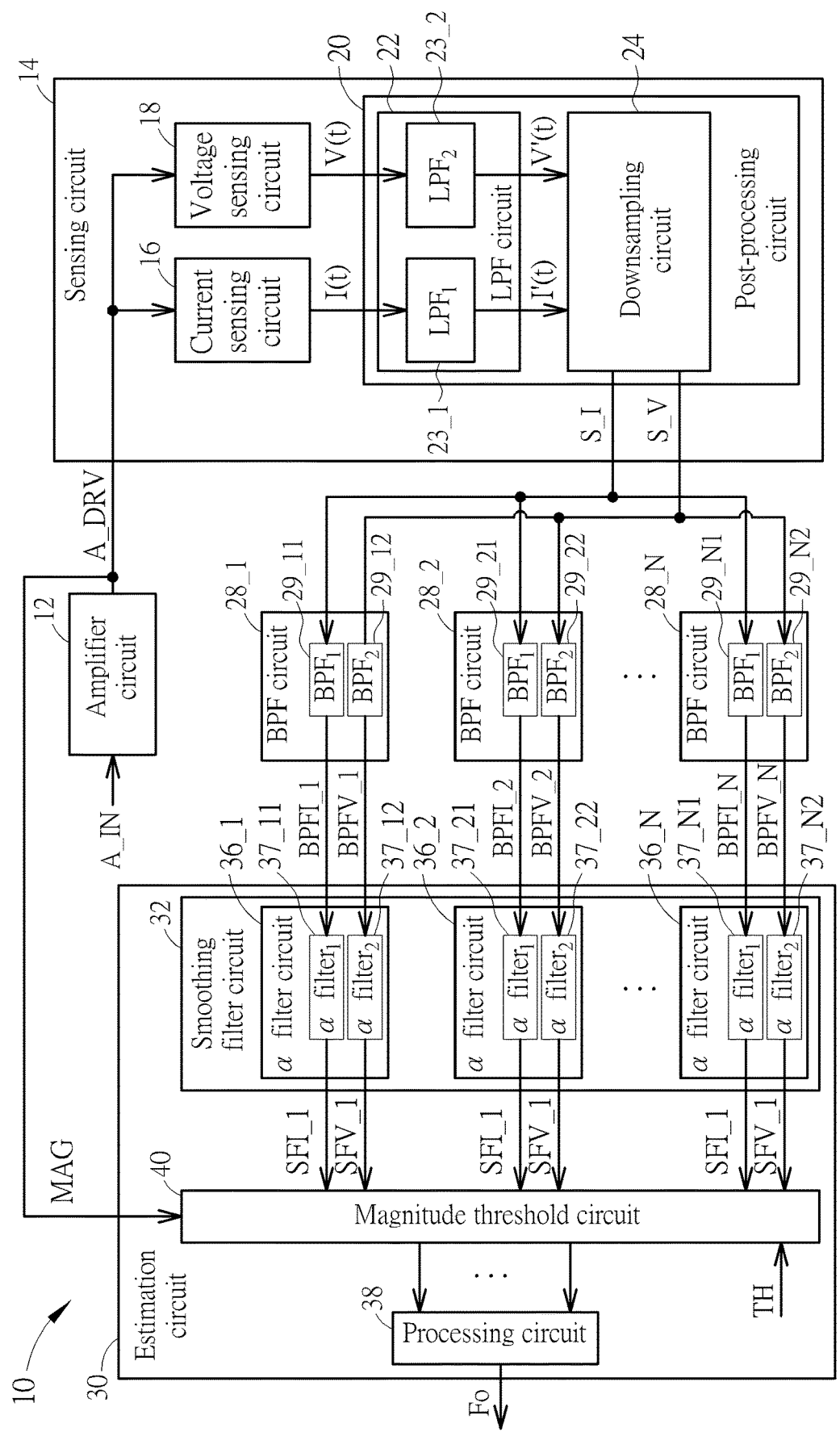
FIG. 10 is a diagram illustrating another exemplary implementation of the loudspeaker controller shown in FIG. 1 according to an embodiment of the present invention.

FIG. 10 is a diagram illustrating another implementation of the loudspeaker controller 10 shown in FIG. 1 according to an embodiment of the present invention. For avoiding an error that occurs when the loudspeaker 50 is being driven for the audio playback at a low volume, the estimation circuit 30 shown in FIG. 10 further includes a magnitude threshold circuit 40. The magnitude threshold circuit 40 is coupled to the amplifier circuit 12, the smoothing filter circuit 32 and the processing circuit 38, and is arranged to compare a magnitude MAG of the driving signal A_DRV with a magnitude threshold TH. When the magnitude MAG of the driving signal A_DRV exceeds the magnitude threshold TH, the estimation circuit 30 estimates the fundamental resonance frequency $F_o$ according to the filter outputs generated from the BPF circuits 28_1-28_N. For example, when the magnitude MAG of the driving signal A_DRV exceeds the magnitude threshold TH, the processing 38 estimates the fundamental resonance frequency $F_o$ by comparing impedance values derived from the smoothed current signals SFI_1-SFI_N and the smoothed voltage signals SFV_1-SFV_N, where the smoothed current signals SFI_1-SFI_N are derived from applying filtering to the band pass filtered current signals BPFI_1-BPFI_N, and the smoothed voltage signals SFV_1-SFV_N are derived from applying filtering to the band pass filtered voltage signals BPFV_1-BPFV_N. When the magnitude MAG of the driving signal A_DRV does not exceed the magnitude threshold TH, the estimation circuit 30 does not estimate the fundamental resonance frequency $F_o$ according to the filter outputs generated from the BPF circuits 28_1-28_N, such that the above-mentioned estimation error under low volume can be avoided.

Figure 11:
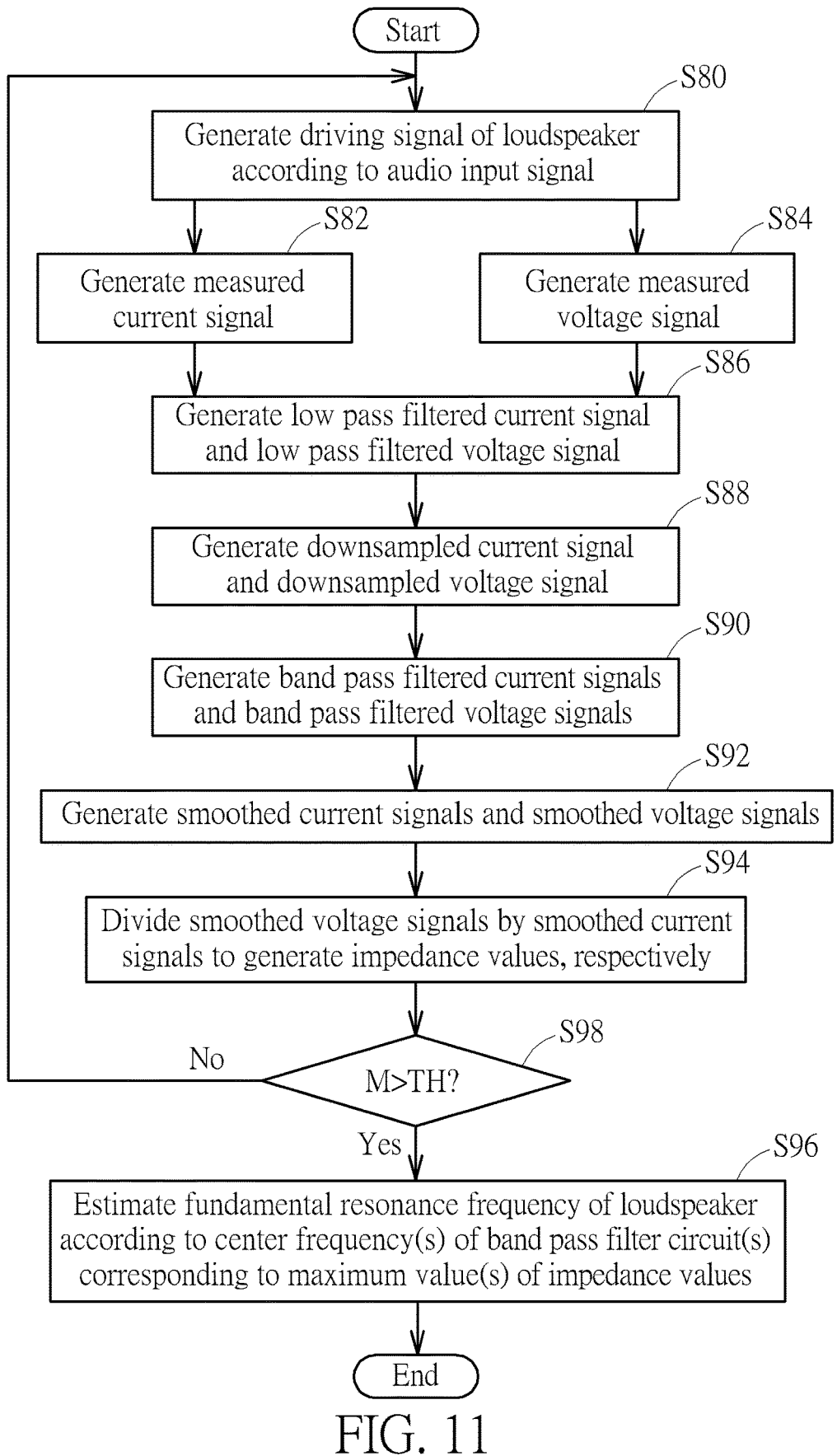
FIG. 11 is a flow chart illustrating another method for estimating a fundamental resonance frequency of a loudspeaker according to an embodiment of the present invention.

FIG. 11 is a flow chart illustrating another method for estimating a fundamental resonance frequency of a loudspeaker according to an embodiment of the present invention. Provided that the result is substantially the same, the steps are not required to be executed in the exact order shown in FIG. 11. For example, the method shown in FIG. 11 may be employed by the loudspeaker controller 10 shown in FIG. 10. The difference between the methods shown in FIG. 3 and FIG. 11 is that the method shown in FIG. 11 further includes a step S98. When the magnitude MAG of the driving signal A_DRV is found exceeding the magnitude threshold TH at step 98, the flow proceeds with step S96. When the magnitude MAG of the driving signal A_DRV is not found exceeding the magnitude threshold TH at step 98, the flow proceeds with step S80 without entering step S96.

In some embodiments of the present invention, only if a current magnitude or a voltage magnitude of the driving signal A_DRV is larger than the magnitude threshold TH, the sensing circuit 14 can sense characteristics of the driving signal A_DRV to generate the measurement signal S_M (which may include the measured current signal I(t) and the measured voltage signal V(t)). For example, the magnitude threshold TH may be set as a current magnitude, and only if the current magnitude of the driving signal A_DRV is larger than TH, the sensing circuit 14 is allowed to sense characteristics of the driving signal to generate the measurement signal S_M, but the present invention is not limited thereto.

Figure 12:
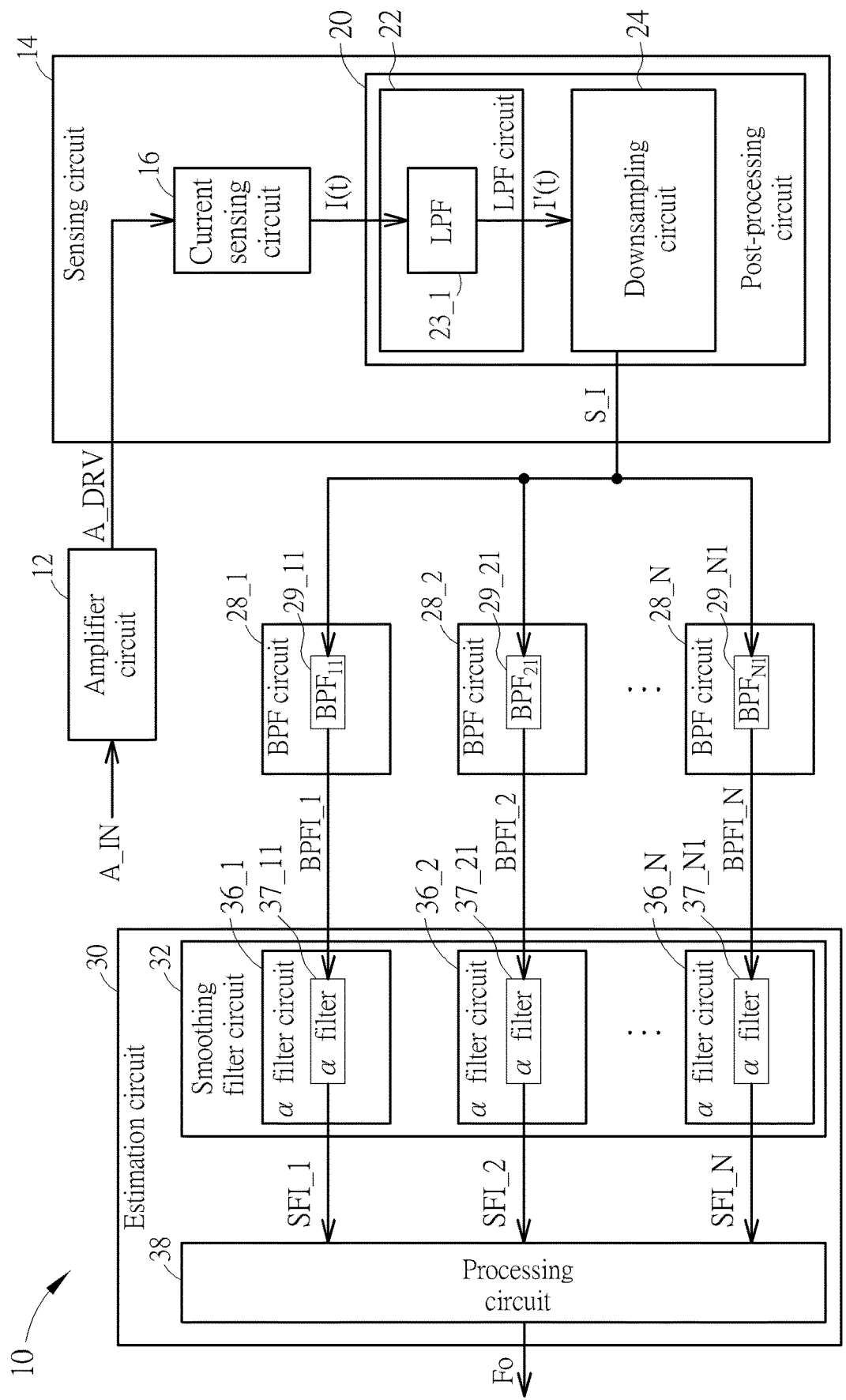
FIG. 12 is a diagram illustrating still another exemplary implementation of the loudspeaker controller shown in FIG. 1 according to an embodiment of the present invention.

FIG. 12 is a diagram illustrating still another exemplary implementation of the loudspeaker controller shown in FIG. 1 according to an embodiment of the present invention. In this embodiment, the voltage may be set as a fixed value, and the relationship between current and impedance is reciprocal. As a result, as shown in FIG. 12, the sensing circuit 14 may comprise a current sensing circuit 16 and a post-processing circuit 20. The current sensing circuit 16 may measure a current flowing through a voice coil of the loudspeaker 50 to generate the measured current signal I(t), and the post-processing circuit 20 is arranged to generate the measurement signal S_M according to the measured current signal I(t). In this embodiment, the post-processing circuit 20 may comprise a LPF circuit 22 and a downsampling circuit 24, wherein the downsampling circuit 24 is coupled to the LPF circuit 22. The LPF circuit 22 may comprise a LPF 23_1, wherein the LPF 23_1 can receive the measured current signal I(t) generated by the current sensing circuit 16, and can low pass filter the measured current signal I(t) to generate a low pass filtered current signal I'(t). For reducing the computational complexity and/or increasing the accuracy, the downsampling circuit 24 may receive the low pass filtered current signal I'(t) to generate a down-sampled current signal S_I, wherein the measurement signal S_M shown in FIG. 1 may comprise the downsampled current signal S_I shown in FIG. 12.

The sensing circuit 14 can transmit the measurement signal S_M to the BPF circuits 28_1-28_N, wherein the measurement signal S_M may comprise a current signal (i.e. the downsampled current signal S_I). In addition, each of the BPF circuits 28_1-28_N may comprise a band pass filter. For example, the BPF circuit 28_1 includes a band pass filter 29_11 (for brevity, labeled as "BPF$_{11}$"); the BPF circuit 28_2 includes a band pass filter 29_21 (for brevity, labeled as "BPF$_{21}$"); and the BPF circuit 28_N includes a band pass filter 29_N1 (for brevity, labeled as "BPF$_{N1}$"). The band pass filter in each of the BPF circuits 28_1-28_N can be arranged to receive the current signal (e.g. downsampled current signal S_I) from the sensing circuit 14, and generate a band pass filtered current signal by filtering the current signal, and a filter output of the band pass filter circuit comprises the band pass filtered current signal. For example, the filter output BPFOUT_1 includes the band pass filtered current signal BPFI_1, the filter output BPFOUT_2 includes the band pass filtered current signal BPFI_2, and the filter output BPFOUT_N includes the band pass filtered current signal BPFI_N and the band pass filtered voltage signal BPFV_N.

The estimation circuit 30 of the loudspeaker controller 10 may comprise a smoothing filter circuit 32 and a processing circuit 38. The smoothing filter circuit 32 can be arrange to receive filter outputs from the BPF circuits 28_1-28_N and generate a plurality of smoothed filter outputs by smoothing the filter outputs respectively. In this embodiment, the smoothing filter circuit 32 may comprise a plurality of alpha filter circuits 36_1, 36_2, . . . , 36_N coupled to the BPF circuits 28_1-28_N, respectively. In addition, each of the alpha filter circuits 36_1-36_N may comprise an alpha filter (for brevity, labeled as "a filter"). For example, the alpha filter circuits 36_1 comprises an alpha filter 37_11 (which is coupled to the band pass filter 29_11), the alpha filter circuit 36_2 comprises an alpha filter 37_21 (which is coupled to the band pass filter 29_21), and the alpha filter circuit 36_N comprises an alpha filter 37_N1 (which is coupled to the band pass filter 29_N1).

As shown in FIG. 12, a smoothed filter output generated from the alpha filter circuit 36_1 includes the smoothed current signal SFI_1 derived from passing the band pass filtered current signal BPFI_1 through the alpha filter 37_11; a smoothed filter output generated from the alpha filter circuit 36_2 includes the smoothed current signal SFI_2 derived from passing the band pass filtered current signal BPFI_2 through the alpha filter 37_21; and a smoothed filter output generated from the alpha filter circuit 36_N includes the smoothed current signal SFI_N derived from passing the band pass filtered current signal BPFI_N through the alpha filter 37_N1.

In this embodiment, since the voltage may be set as a fixed value, for each of the smoothed filter outputs (particularly, the smoothed current signals) generated from the smoothing filter circuit 32 (particularly, alpha filter circuits 36_1-36_N of the smoothing filter circuit 32), the processing circuit 38 may be arranged to compare the magnitude of each of the smoothed current signals, wherein the smaller is the magnitude of the smoothed current signal, the larger is the fundamental resonance frequency F$_o$ of the loudspeaker 50 estimated by the processing circuit 38. As a result, in a case where one minimum value is identified from the magnitude of the smoothed current signals {SFI_1, SFI_2, . . . , SFI_N}, the fundamental resonance frequency F$_o$ of the loudspeaker 50 is estimated as the center frequency of the band pass filter circuit involved in derivation of the minimum value. For example, if the center frequency of the band pass filter circuit corresponding to the minimum value among the magnitude of the smoothed current signals {SFI_1, SFI_2, . . . , SFI_N} is 200 Hz, the fundamental resonance frequency F$_o$ of the loudspeaker 50 can be estimated as 200 Hz. For brevity, similar descriptions for this embodiment are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A loudspeaker controller for estimating a fundamental resonance frequency of a loudspeaker, comprising:
   an amplifier circuit, arranged to generate a driving signal of the loudspeaker according to an audio input signal;
   a sensing circuit, arranged to sense characteristics of the driving signal to generate a measurement signal;
   a plurality of band pass filter circuits, arranged to filter the measurement signal to generate a plurality of filter outputs, respectively, wherein the plurality of band pass filter circuits have different passbands; and
   an estimation circuit, arranged to estimate the fundamental resonance frequency according to the plurality of filter outputs;
   wherein the fundamental resonance frequency is estimated according to a plurality of impedance values corresponding to the plurality of filter outputs, respectively;
   wherein in response to a maximum value being identified from the plurality of impedance values, the fundamental resonance frequency is estimated as a center frequency of a band pass filter circuit that is involved in derivation of the maximum value in the plurality of band pass filter circuits; or in response to impedance values that have a same maximum value being identified from the plurality of impedance values, the fundamental resonance frequency is estimated as an average of center frequencies of band filter circuits that are involved in derivation of said impedance values having said same maximum value in the plurality of band pass filter circuits.

2. The loudspeaker controller of claim 1, wherein the sensing circuit comprises:
   a current sensing circuit, arranged to generate a measured current signal by measuring a current flowing through a voice coil of the loudspeaker;
   a voltage sensing circuit, arranged to generate a measured voltage signal by measuring a voltage across the voice coil of the loudspeaker; and
   a post-processing circuit, arranged to generate the measurement signal according to the measured current signal and the measured voltage signal.

3. The loudspeaker controller of claim 2, wherein the post-processing circuit comprises:
   a low pass filter circuit, arranged to filter the measured current signal to generate a low pass filtered current signal, and filter the measured voltage signal to generate a low pass filtered voltage signal; and
   a downsampling circuit, arranged to downsample the low pass filtered current signal to generate a downsampled current signal, and downsample the low pass filtered voltage signal to generate a downsampled voltage signal;

wherein the measurement signal output from the post-processing circuit comprises the downsampled current signal and the downsampled voltage signal.

4. The loudspeaker controller of claim 1, wherein the measurement signal comprises a current signal and a voltage signal; each of the plurality of band pass filter circuits comprises a first band pass filter and a second band pass filter; and for said each of the plurality of band pass filter circuits, the first band pass filter is arranged to generate a band pass filtered current signal by filtering the current signal, and the second band pass filter is arranged to generate a band pass filtered voltage signal by filtering the voltage signal; a filter output of said each of the plurality of band pass filter circuits comprises the band pass filtered current signal and the band pass filtered voltage signal.

5. The loudspeaker controller of claim 4, wherein the estimation circuit comprises:
a smoothing filter circuit, arranged to smooth the plurality of filter outputs to generate a plurality of smoothed filter outputs, respectively, wherein each of the plurality of smoothed filter outputs comprises a smoothed current signal and a smoothed voltage signal; and
a processing circuit, arranged to estimate the fundamental resonance frequency according to the plurality of smoothed filter outputs.

6. The loudspeaker controller of claim 5, wherein the smoothing filter circuit comprises a plurality of alpha filter circuits; each of the plurality of alpha filter circuits comprises a first alpha filter and a second alpha filter; and for said each of the plurality of smoothed filter outputs, the smoothed current signal is generated by using a first alpha filter, and the smoothed voltage signal is generated by using a second alpha filter.

7. The loudspeaker controller of claim 5, wherein for each of the plurality of smoothed filter outputs, the processing circuit is arranged to divide the smoothed voltage signal by the smoothed current signal to generate an impedance value; and the processing circuit is further arranged to estimate the fundamental resonance frequency by comparing a plurality of impedance values obtained from the plurality of smoothed filter outputs.

8. The loudspeaker controller of claim 1, wherein the estimating circuit is further arranged to compare a magnitude of the driving signal with a magnitude threshold; and in response to the magnitude of the driving signal exceeding the magnitude threshold, the estimation circuit estimates the fundamental resonance frequency according to the plurality of filter outputs.

9. The loudspeaker controller of claim 1, wherein during the loudspeaker is being driven for audio playback, the loudspeaker controller estimates the fundamental resonance frequency of the loudspeaker in a real-time manner.

10. A method for estimating a fundamental resonance frequency of a loudspeaker, comprising:
generating a driving signal of the loudspeaker according to an audio input signal;
sensing characteristics of the driving signal to generate a measurement signal;
filtering the measurement signal, by a plurality of band pass filter circuits having different passbands, to generate a plurality of filter outputs; and
estimating the fundamental resonance frequency according to the plurality of filter outputs;
wherein the fundamental resonance frequency is estimated according to a plurality of impedance values corresponding to the plurality of filter outputs, respectively;
wherein in response to a maximum value being identified from the plurality of impedance values, the fundamental resonance frequency is estimated as a center frequency of a band pass filter circuit that is involved in derivation of the maximum value in the plurality of band pass filter circuits; or in response to impedance values that have a same maximum value being identified from the plurality of impedance values, the fundamental resonance frequency is estimated as an average of center frequencies of band filter circuits that are involved in derivation of said impedance values having said same maximum value in the plurality of band pass filter circuits.

11. The method of claim 10, wherein sensing the characteristics of the driving signal to generate the measurement signal comprises:
generating a measured current signal by measuring a current flowing through a voice coil of the loudspeaker;
generating a measured voltage signal by measuring a voltage across the voice coil of the loudspeaker; and
generating the measurement signal according to the measured current signal and the measured voltage signal.

12. The method of claim 11, wherein generating the measurement signal according to the measured current signal and the measured voltage signal comprises:
low pass filtering the measured current signal to generate a low pass filtered current signal;
low pass filtering the measured voltage signal to generate a low pass filtered voltage signal;
downsampling the low pass filtered current signal to generate a downsampled current signal; and
downsampling the low pass filtered voltage signal to generate a downsampled voltage signal;
wherein the measurement signal comprises the downsampled current signal and the downsampled voltage signal.

13. The method of claim 10, wherein the measurement signal comprises a current signal and a voltage signal, each of the plurality of band pass filter circuits comprises a first band pass filter and a second band pass filter, and filtering the measurement signal to generate the plurality of filter outputs comprises:
for said each of the plurality of band pass filter circuits:
filtering the current signal, by the first band pass filter, to generate a band pass filtered current signal; and
filtering the voltage signal, by the second band pass filter, to generate a band pass filtered voltage signal;
wherein a filter output of said each of the plurality of band pass filter circuits comprises the band pass filtered current signal and the band pass filtered voltage signal.

14. The method of claim 13, wherein estimating the fundamental resonance frequency according to the plurality of filter outputs comprises:
smoothing the plurality of filter outputs to generate a plurality of smoothed filter outputs, respectively, wherein each of the plurality of smoothed filter outputs comprises a smoothed current signal and a smoothed voltage signal; and
estimating the fundamental resonance frequency according to the plurality of smoothed filter outputs.

15. The method of claim 14, wherein for said each of the plurality of smoothed filter outputs, the smoothed current signal is generated by using a first alpha filter, and the smoothed voltage signal is generated by using a second alpha filter.

16. The method of claim 14, wherein estimating the fundamental resonance frequency according to the plurality of smoothed filter outputs comprises:
- for each of the plurality of smoothed filter outputs, dividing the smoothed voltage signal by the smoothed current signal to generate an impedance value;
- estimating the fundamental resonance frequency by comparing a plurality of impedance values obtained from the plurality of smoothed filter outputs.

17. The method of claim 10, wherein estimating the fundamental resonance frequency according to the plurality of filter outputs comprises:
- comparing a magnitude of the driving signal with a magnitude threshold; and
- in response to the magnitude of the driving signal exceeding the magnitude threshold, estimating the fundamental resonance frequency according to the plurality of filter outputs.

18. The method of claim 10, wherein during the loudspeaker is being driven for audio playback, the method estimates the fundamental resonance frequency of the loudspeaker in a real-time manner.

* * * * *